US011667335B2

(12) United States Patent
Ozog et al.

(10) Patent No.: US 11,667,335 B2
(45) Date of Patent: Jun. 6, 2023

(54) COUNTERACTING BACKDRIVE IN A POWER TAILGATE SYSTEM

(71) Applicant: Aisin Technical Center of America, Inc., Northville, MI (US)

(72) Inventors: Nicholas Ozog, South Lyon, MI (US); Ryan Heins, Wixom, MI (US); Gowtham Harsha Pulikonda, New Hudson, MI (US); Yasuyuki Noiri, Walled Lake, MI (US)

(73) Assignee: Aisin Technical Center of America, Inc., Northville, MI (US)

( * ) Notice: Subject to any disclaimer, the term of this patent is extended or adjusted under 35 U.S.C. 154(b) by 271 days.

(21) Appl. No.: 17/205,244

(22) Filed: Mar. 18, 2021

(65) Prior Publication Data

US 2022/0297771 A1 Sep. 22, 2022

(51) Int. Cl.
*B62D 33/03* (2006.01)
*B62D 33/027* (2006.01)
(Continued)

(52) U.S. Cl.
CPC ........ *B62D 33/0273* (2013.01); *E05F 15/611* (2015.01); *H02P 27/08* (2013.01);
(Continued)

(58) Field of Classification Search
CPC .. B62D 33/0273; B62D 33/03; B62D 33/033; E05F 15/611; E05Y 2201/434;
(Continued)

(56) References Cited

U.S. PATENT DOCUMENTS 5,004,287 A * 4/1991 Doyle ................ B62D 33/0273
292/DIG. 43
7,156,441 B2 1/2007 Austin
(Continued)

OTHER PUBLICATIONS

Article titled,"Electric Motor Back-Drive and Braking" (available at https://www.groschopp.com/electric-motor-back-drive-ability-and-braking/) dated Mar. 27, 2013; accessed Dec. 9, 2020.
(Continued)

*Primary Examiner* — Gregory A Blankenship
(74) *Attorney, Agent, or Firm* — Christopher G. Darrow; Darrow Mustafa PC (57) ABSTRACT

Embodiments of systems and methods for operating a power tailgate system are disclosed. A vehicle includes a rotatable element structured for operable connection with, and disconnection from, a tailgate when the rotatable element resides in a predetermined tailgate removal orientation. A motor is connected with the rotatable element for interdependent movement, and a motor circuit is provided for the motor. During a driving event, the system identifies when no tailgate is connected with the rotatable element. If no tailgate is connected with the rotatable element, the system determines if the rotatable element resides in the predetermined tailgate removal orientation. If the rotatable element resides in the predetermined tailgate removal orientation, the system may check the rotatable element against rotation during the driving event by operating a motor circuit to electrically brake the motor to prevent the rotatable element from rotating out of the predetermined tailgate removal orientation.

20 Claims, 6 Drawing Sheets

(51) Int. Cl.
*E05F 15/611* (2015.01)
*H02P 27/08* (2006.01)
(52) U.S. Cl.
CPC ......... *B62D 33/03* (2013.01); *E05Y 2201/434* (2013.01); *E05Y 2400/302* (2013.01); *E05Y 2400/35* (2013.01); *E05Y 2900/516* (2013.01); *E05Y 2900/546* (2013.01)
(58) Field of Classification Search
CPC ........... E05Y 2400/302; E05Y 2400/35; E05Y 2900/516; E05Y 2900/546
See application file for complete search history.

(56) References Cited

U.S. PATENT DOCUMENTS

| | | | | |
|---|---|---|---|---|
| 2004/0108743 | A1* | 6/2004 | Gruber | B62D 33/0273 296/57.1 |
| 2007/0132264 | A1* | 6/2007 | Koneval | B62D 33/0273 296/57.1 |
| 2008/0054667 | A1* | 3/2008 | Ohly | B62D 33/0273 296/57.1 |
| 2008/0100085 | A1* | 5/2008 | Ohly | B62D 33/0273 296/57.1 |
| 2013/0342010 | A1* | 12/2013 | Nagler | H02P 7/04 307/10.1 |
| 2017/0274869 | A1* | 9/2017 | Da Deppo | B62D 33/037 |
| 2017/0342760 | A1* | 11/2017 | Be | E05F 15/70 |
| 2020/0148283 | A1* | 5/2020 | Robinson | B62D 33/03 |
| 2022/0212603 | A1* | 7/2022 | Castro | B60R 1/00 |
| 2022/0297771 | A1* | 9/2022 | Ozog | B62D 33/0273 |
| 2022/0316258 | A1* | 10/2022 | Pulikonda | B62D 33/0273 |
| 2022/0316259 | A1* | 10/2022 | Pulikonda | B62D 33/0273 |
| 2022/0379978 | A1* | 12/2022 | Pencak | B62D 33/0273 |
| 2022/0381067 | A1* | 12/2022 | Noiri | B62D 33/03 |

OTHER PUBLICATIONS

Collins, "What is back driving and why is it important?", found at: https://www.linearmotiontips.com/what-is-back-driving-and-why-is-it-important/, dated Mar. 7, 2017; accessed Dec. 10, 2020.

U.S. Appl. No. 16/883,246, filed May 26, 2020, titled "Hinge Assembly for a Power Tailgate System".

* cited by examiner

COUNTERACTING BACKDRIVE IN A POWER TAILGATE SYSTEM

TECHNICAL FIELD

The embodiments disclosed herein relate to vehicles with tailgates and, more particularly, to power tailgate systems for automatically opening the tailgates and automatically closing the tailgates.

BACKGROUND

Many vehicles include tailgates. The tailgates serve as closure panels, and are movable between closed positions and open positions. Many of today's vehicles with tailgates also include power tailgate systems. The power tailgate systems include motor-driven tailgate actuators for the tailgates, and motor-driven latch actuators for the latch assemblies. Moreover, the power tailgate systems include hinge assemblies for the tailgates, through which the tailgate actuators are connected with the tailgates. By the operation of the tailgate actuators and the latch actuators, the power tailgate systems automatically open the tailgates and automatically close the tailgates.

Some vehicles are configured to permit the tailgate to be manually detached or disconnected from the vehicle. To enable disconnection, the tailgate may be detachably connected to a rotatable element of the hinge assembly, such as a torque shaft structured to convert linearly-acting forces of the actuator to rotational forces for rotating the tailgate. However, there may be angular orientations of the rotatable element at which detachment of the tailgate from the rotatable element and/or re-attachment of the tailgate to the rotatable element is difficult or prevented by design. In addition, after tailgate removal and before reinstallation, the tailgate actuator and/or hinge assembly may experience vibration, bouncing, jolts and other external forces when the vehicle drives along rough ground, accelerates and brakes. These external forces may cause back-driving of the actuator. If the tailgate actuator is back-driven by the external forces, the rotatable element may rotate out of alignment with the removal/reinstallation orientation, thereby making re-attachment of the tailgate difficult or impossible.

SUMMARY

In one aspect of the embodiments described herein, a vehicle power tailgate system includes a processor and a memory communicably coupled to the processor. The memory stores instructions that when executed by the processor cause the processor to, upon initiation of a driving event in a vehicle, identify when no tailgate is operably connected with a rotatable element structured for transmitting rotational force to the tailgate. The instructions also cause the processor to, responsive to identifying that no tailgate is operably connected with the rotatable element, determine if the rotatable element resides in a predetermined tailgate removal orientation. The instructions also cause the processor to, responsive to a determination that the rotatable element resides in the predetermined tailgate removal orientation, check the rotatable element against rotation during the driving event by electrically braking a motor operably connected with the rotatable element for interdependent movement.

In another aspect of the embodiments described herein, a method is provided for operating a vehicle power tailgate system. The method includes a step of, upon initiation of a driving event in a vehicle, identifying when no tailgate is operably connected with a rotatable element structured for transmitting rotational force to the tailgate. The method also includes a step of, responsive to identifying that no tailgate is operably connected with the rotatable element, determining if the rotatable element resides in a predetermined tailgate removal orientation. The method includes a step of, responsive to a determination that the rotatable element resides in the predetermined tailgate removal orientation, checking the rotatable element against rotation during the driving event by electrically braking a motor operably connected with the rotatable element for interdependent movement.

In another aspect of the embodiments described herein, a vehicle power tailgate system is provided. The system includes a processor and a memory communicably coupled to the processor. The memory stores instructions that when executed by the processor cause the processor to, upon initiation of a driving event in a vehicle, identify when no tailgate is operably connected with a rotatable element structured for transmitting rotational force to the tailgate. The instructions also cause the processor to, responsive to identifying that no tailgate is operably connected to the rotatable element, determine if the rotatable element resides in a predetermined tailgate removal orientation. The instructions also cause the processor to, responsive to a determination that the rotatable element does not reside in the predetermined tailgate removal orientation, control rotation of the rotatable element to bring the rotatable element to the predetermined tailgate removal orientation.

BRIEF DESCRIPTION OF THE DRAWINGS

The various features, advantages and other uses of the present embodiments will become more apparent by referring to the following detailed description and drawing in which.

DETAILED DESCRIPTION

This disclosure relates to a vehicle that includes a tailgate, and, as part of a power tailgate system, a motor connected with the tailgate for interdependent movement. In relation to the vehicle, this disclosure teaches systems and methods for operating the power tailgate system. The tailgate may be rotatably connected to the vehicle via a rotatable element mounted on the vehicle and operably connected to the motor. The motor is operable to rotate the rotatable element, by which the connected tailgate is rotated between closed and open positions. The tailgate may be structured to be disconnectable from (and re-connectible with) the rotatable element when the tailgate/rotatable element has been rotated open to predetermined tailgate removal angle within a specified range. The power tailgate system checks the tailgate against movement by electrically braking the motor. After disconnection of the tailgate from the vehicle, the power tailgate system may also automatically check the rotatable element against rotation from the predetermined tailgate removal orientation. This maintains the rotatable element in the proper angular orientation for tailgate re-connection, for the convenience of a user. In addition, the power tailgate system determines when the rotatable element has deviated from the predetermined tailgate removal orientation (due to shock or vibration, for example). The power tailgate system may then control operation of the motor to automatically rotate the rotatable element back to the predetermined tailgate removal orientation for tailgate re-connection.

Figure 1A:
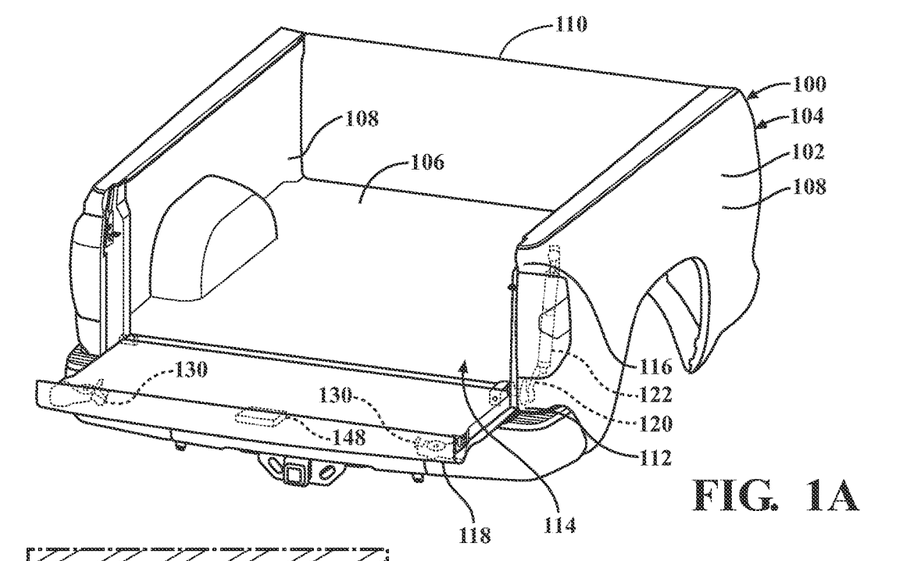
FIG. 1A is a rear perspective view of a vehicle including a truck bed having a tailgate shown in an open position, and incorporating a power tailgate system in accordance with an embodiment described herein.

Part of a representative passenger vehicle 100 is shown in FIG. 1A. As shown, the vehicle 100 is a pickup truck. The vehicle 100 includes an exterior and a number of interior compartments. In the illustrated pickup truck configuration of the vehicle 100, the compartments include an open-topped bed 102 for carrying cargo. In addition to the bed 102, the compartments may include a passenger compartment, an engine compartment and the like. Among other things, the vehicle 100 may include seats, a dash assembly, an instrument panel and the like housed in the passenger compartment. In addition, the vehicle 100 may include an engine, a transmission and the like, as well as other powertrain components, such as wheels, housed in the engine compartment and elsewhere in the vehicle 100. The wheels support the remainder of the vehicle 100 on the ground. One, some or all of the wheels are powered by the remainder of the powertrain components to drive the vehicle 100 along the ground.

The vehicle 100 includes a body 104 that forms the exterior and defines or otherwise encloses the bed 102 and the other compartments. In relation to the bed 102, the body 104 includes a deck 106, two sides 108, a bulkhead 110 and a rear end 112. At the rear end 112, the body 104 defines a tailgate opening 114. Likewise, the body 104, including but limited to the sides 108, renders surrounding body 116 that frames the tailgate opening 114. The tailgate opening 114 opens between the bed 102 and the exterior. Relatedly, as part of the rear end 112, the body 104 includes a tailgate 118 corresponding to the tailgate opening 114.

Figure 1B:
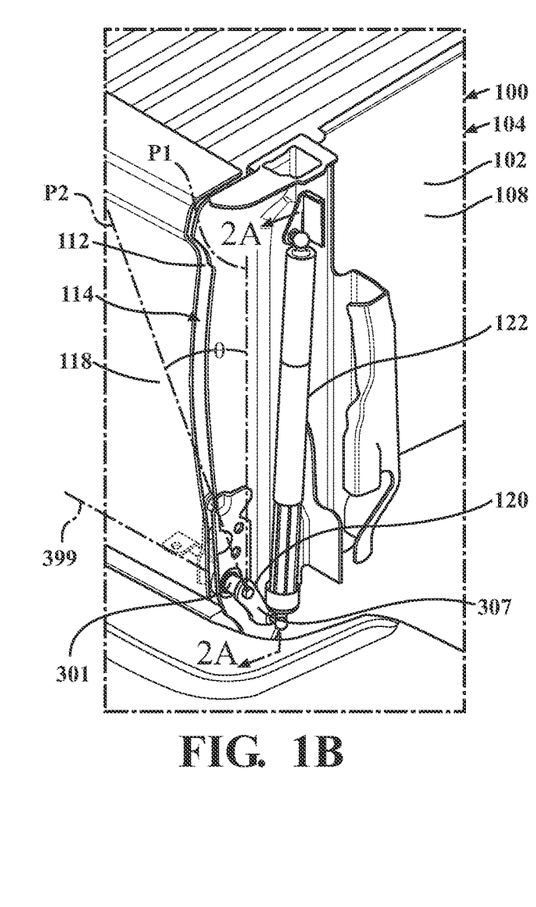
FIG. 1B is a perspective view of a portion of the vehicle of FIG. 1A, showing an actuator, crank, and rotatable element of the power tailgate system mounted in the vehicle.
Figure 1C:
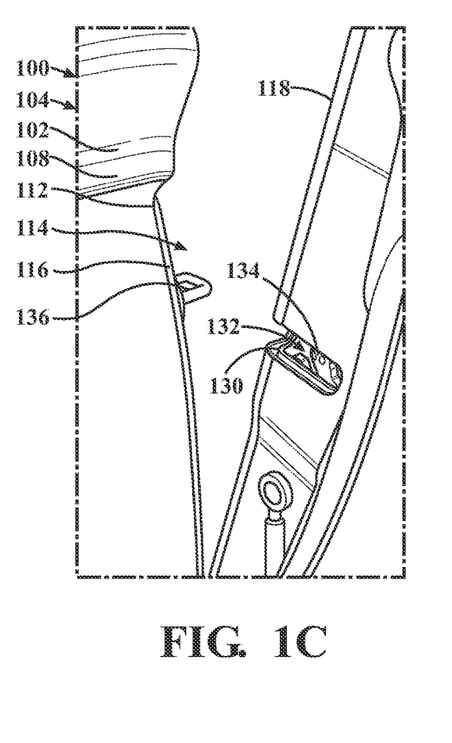
FIG. 1C is a perspective view of a portion of a tailgate and a wall defining the truck bed, showing a tailgate-side latch assembly including a latch for latching the tailgate and a vehicle-side striker for the latch.

As shown with additional reference to FIGS. 1B and 1C, the tailgate 118 serves as closure panel for the bed 102. The tailgate 118 is pivotally connected to the surrounding body 116 for movement, relative to the tailgate opening 114, between a closed (or "up") position and an open (or "down") position through a range of partially-open positions. In FIG. 1B, the tailgate 118 is shown in the closed position. In the closed position, the tailgate 118 is positioned over the tailgate opening 114, with the periphery of the tailgate 118 adjacent to the surrounding body 116, and the tailgate 118 in alignment with the surrounding body 116. In FIG. 1A, the tailgate 118 is shown in the open position. In the open position, the tailgate 118 is positioned away from the tailgate opening 114, which allows access to the bed 102 from the rear of the vehicle 100. In FIG. 1C, the tailgate 118 is shown in a representative partially-open position. In the partially-open positions, the tailgate 118 is between the closed position and the open position.

As shown with particular reference to FIG. 1B, in relation to opening the tailgate 118 and closing the tailgate 118, the vehicle 100 includes a hinge assembly 120, and an in-bed tailgate actuator 122. Serving, at least in part, as a basic hinge, the hinge assembly 120 runs between the bed 102 and the tailgate 118. The hinge assembly 120 connects the tailgate 118 to the bed 102, and supports the tailgate 118 from the bed 102 for rotational movement between the closed position and the open position. The tailgate actuator 122 corresponds to the hinge assembly 120, and may be housed, in whole or in part, in the bed 102. From inside the bed 102, the tailgate actuator 122 is connected with the tailgate 118 through the hinge assembly 120. Although the vehicle 100, as shown, includes one hinge assembly 120, and one tailgate actuator 122, it will be understood that this disclosure is applicable in principle to otherwise similar vehicles 100 including one or more hinge assemblies 120, and one or more tailgate actuators 122.

Referring to FIG. 1B, in one or more arrangements, the hinge assembly 120 may include a rotatable element 301 structured for transmitting rotational force to the tailgate. In one or more arrangements, the rotatable element may be rotary through-bed torque shaft incorporated into the hinge assembly 120 for operable connection with the tailgate. In other arrangements, the rotatable element may be another rotatable portion of the hinge assembly structured for operable connection with the tailgate, depending on the particular hinge assembly design. The rotatable element 301 may be axially aligned with the pivotal movement of the tailgate 118, and supported from the bed 102 for axial rotation. The rotatable element 301 may support the tailgate 118 for rotation about an associated rotatable element rotational axis 399. Moreover, the hinge assembly 120 may also include a pivotal in-bed crank 307 operably connected to the rotatable element 301 along the rotational axis 399 of the rotatable element 301 so that a rotation of the crank 307 produces a corresponding rotation of the rotatable element 301 about the axis 399 (i.e., rotating the crank 307 45° about the rotatable element rotational axis 399 produces a corresponding rotation of the rotatable element 301 45° about the axis). From outside the bed 102, the rotatable element 301 may be connected to and support the tailgate 118 from the bed 102. From inside the bed 102, the tailgate actuator 122 is connected between the bed 102 and the crank 307. Moreover, the bed 102, the tailgate actuator 122 and the crank 307 serially share pivotal connections. The rotatable element 301 may transmit torque and rotation associated with the pivotal movement of the tailgate 118 between the tailgate and the crank 307. In this manner, the actuator motor 210 motor may be operably connected with the rotatable element for interdependent movement. Specifically, the motor 210 may be operably connected with the rotatable element 301 for producing a rotation of the rotatable element in the manner described herein. The term "operably connected," as used throughout this description, can include direct or indirect connections, including connections without direct physical contact. A tailgate may be considered to be operably connected with the rotatable element 301 when the rotation of the rotatable element produces a corresponding rotation of the tailgate, as described above.

With the bed 102, the tailgate actuator 122 and the crank 307 serially sharing pivotal connections, from between the bed 102 and the crank 307, as the product of extending and retracting as described herein, the tailgate actuator 122 is operable to pivot the crank 307 against the bed 102. With the tailgate 118, the rotatable element 301 and the crank 307 serially sharing rotary connections, as the crank 307 pivots, the rotatable element 301 axially rotates, and, as the rotatable element 301 axially rotates, the tailgate 118 pivotally closes, pivotally opens, and otherwise pivotally moves between the open position and the closed position.

In one or more arrangements, the hinge assembly may be structured as described in pending commonly-owned U.S. patent application Ser. No. 16/883,246, the disclosure of which is incorporated by reference herein in its entirety.

In one or more arrangements, the tailgate 118 may be operably connected to the rotatable element 301 so as to enable manual or assisted disconnection of the tailgate from the rotatable element, so that the tailgate may be removed from the vehicle. Any of a variety of detachable tailgate connection mechanisms may be used, provided the connection mechanism used couples the tailgate 118 to the rotatable element 301 so that the rotatable element and the tailgate rotate in association with each other when the tailgate 118 is connected to the rotatable element 301.

Figure 4:
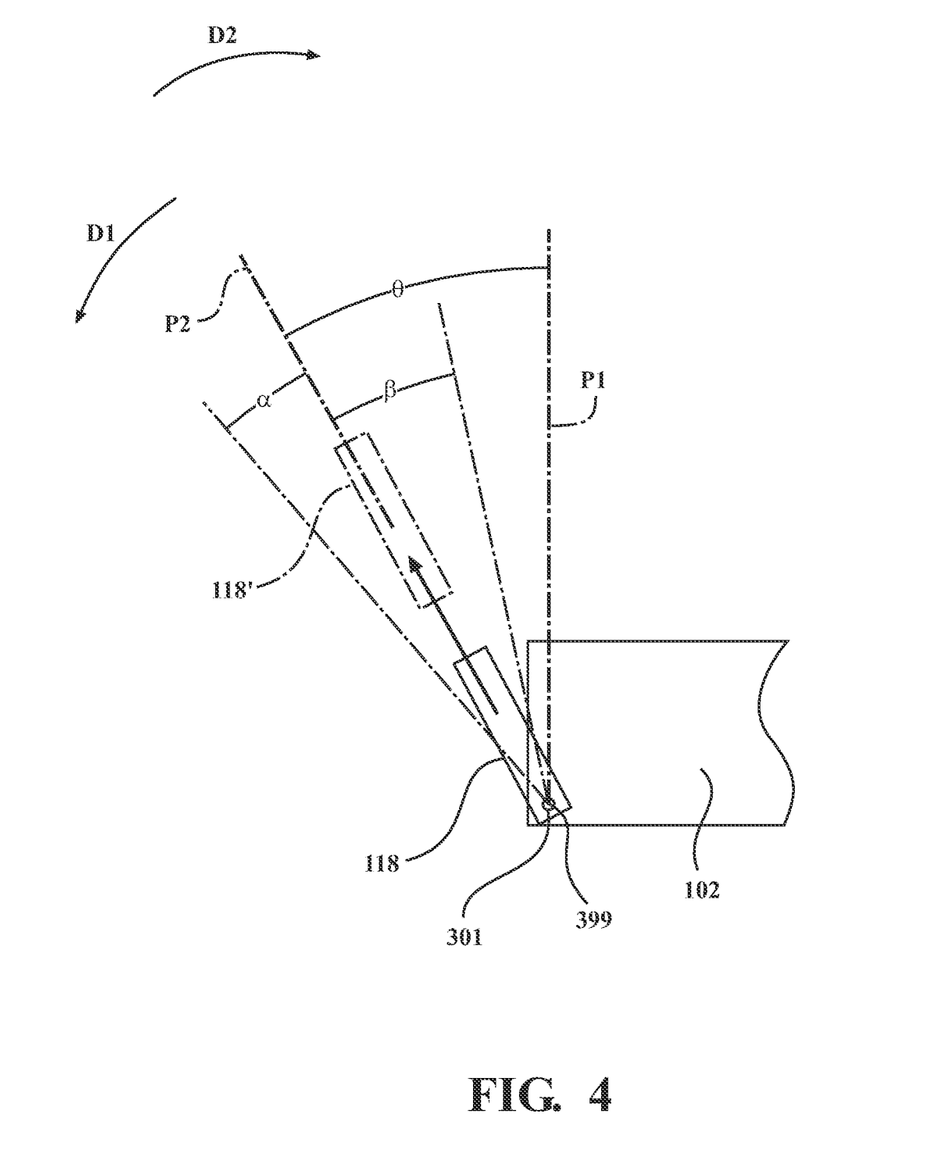
FIG. 4 is a schematic side view of a portion of the vehicle showing removal of a tailgate from the vehicle after the tailgate has been rotated to a predetermined tailgate removal orientation θ of the rotatable element/tailgate.

Referring to FIGS. 1B and 4, in one or more arrangements, the tailgate 118 and an associated connection mechanism may be structured to enable disconnection or detachment of the tailgate from the rotatable element 301 when the tailgate and the rotatable element to which it is connected reside at a predetermined angular orientation (referred to herein as the "predetermined tailgate removal orientation" or the "predetermined removal orientation") with respect to a vertical plane P1 extending through the rotational axis 399 of the rotatable element 301. The predetermined tailgate removal orientation of the rotatable element 301 may be an angular orientation of the rotatable element at which a tailgate 118 can be disconnected from the rotatable element 301 by a user, so that the tailgate 118 may be removed from the vehicle. The predetermined tailgate removal orientation may also be an angular orientation of the rotatable element 301 at which a tailgate 118 can be operably connected or re-connected to the rotatable element 301 after removal so that the rotatable element can transmit forces to the tailgate for rotating the tailgate.

The predetermined tailgate removal orientation may reside between the closed and open positions of the tailgate 118, in a condition in which the tailgate is partially open. A closed condition of the tailgate (an example of which is shown in FIG. 1B) occurs when the tailgate extends vertically or near vertically with respect to the bed so as to be in a position where the latch assemblies 130 (described below) are engaged or may be engaged to lock the tailgate 118 in the closed position. An open condition of the tailgate 118 (as shown in FIG. 1A) occus when the tailgate is in the farthest open position or orientation (i.e., as far as it can extend from the closed position), while a partially-open condition (examples of which are shown in FIGS. 1C and 4) is any condition intermediate between the open and closed conditions.

Referring again to FIGS. 1B and 4, in particular arrangements, the predetermined tailgate removal orientation may be defined by an angle θ between the vertical reference plane P1 extending through the rotatable element rotational axis 399, and a tailgate orientation plane P2 also passing through the rotatable element rotational axis 399. The tailgate orientation plane P2 may extend vertically through the rotatable element rotational axis 399 when the tailgate 118 is in the closed condition. The tailgate orientation plane P2 also rotates in correspondence with the tailgate 118 and rotatable element 301, thereby varying the tailgate orientation angle. Thus, when the tailgate 118 is in the closed condition, the orientation plane P2 and the reference plane P1 may be coplanar.

In particular arrangements, the predetermined removal orientation θ of the tailgate 118 and rotatable element 301 may occur when the tailgate orientation plane P2 resides at an angle of 45°±2° with respect to the reference plane P1. Thus, in this arrangement for example, the tailgate 118 may be detached from the rotatable element 301 when the tailgate 118 has been rotated backwards or opened 45°±2° from its closed condition.

In one or more arrangements, the tailgate 118 and/or rotatable element 301 may be structured so that the tailgate is connectible and disconnectable with the rotatable element only when the rotatable element 301 is in the predetermined tailgate removal orientation θ. In such arrangement(s), a mechanism used to operably connect the tailgate 118 to the rotatable element 301 may be structured to prevent disconnection of the tailgate from the rotatable element whenever the tailgate and rotatable element are not in the predetermined removal orientation θ. Similarly, the connection mechanism used may be structured to allow manual operable re-connection of the tailgate with the rotatable element only when the tailgate and rotatable element have been rotated to the predetermined removal orientation θ. In such arrangement(s), the predetermined tailgate removal orientation θ may provide a preferred tailgate disconnection and re-connection orientation for the user, and a control command may be provided to automatically rotate the tailgate/rotatable element to the predetermined removal orientation θ from any other angle of the tailgate/rotatable element.

In embodiments described herein, when the rotatable element 301 is in the predetermined tailgate removal orientation θ, the hinge assembly 120 is also considered to reside in a respective predetermined tailgate removal configuration of the hinge assembly. As well as the rotatable element 301 being in the predetermined removal orientation θ, the predetermined tailgate removal configuration of the hinge assembly may include an associated angular orientation of the crank 307 and other elements of the hinge assembly particular to the assembly configuration that occur when the rotatable element 301 is in the predetermined removal orientation θ.

Moreover, as shown with particular reference to FIG. 1C, the vehicle 100 includes one or more tailgate-side latch assemblies 130. Each latch assembly 130 includes a striker chute 132, and a corresponding latch 134 for latching the tailgate 118. Relatedly, the vehicle 100 includes one or more vehicle-side strikers 136 corresponding to the striker chutes 132 and the latches 134. Each latch assembly 130 is connected to the tailgate 118. Each latch assembly 130 may be housed, in whole or in part, in the tailgate 118. For instance, each latch assembly 130 may be housed in the tailgate 118, and connected to the tailgate 118, as a unitary module. Each striker 136 is connected to the surrounding body 116. Although the vehicle 100, as shown, includes two latch assemblies 130 and two strikers 136, it will be understood that this disclosure is applicable in principle to otherwise similar vehicles including one or more latch assemblies 130 and one or more strikers 136.

For each corresponding striker chute 132, latch 134 and striker 136, the striker chute 132 opens to the tailgate 118 for passing the striker 136 into and out of the tailgate 118. The latch 134 is movable, relative to the striker chute 132, in a latching direction and in an unlatching direction between an unlatching position and a latching position. In FIG. 1C, the latch 134 is shown in the unlatching position. In the unlatching position, the latch 134 aligns with the striker chute 132 for passing the striker 136 into and out of the tailgate 118. In the latching position, the latch 134 crosses the striker chute 132 for capturing the striker 136 within the tailgate 118. Accordingly, the latch 134 latches the tailgate 118 to the surrounding body 116 against the striker 136.

The latch 134 may be activated for non-revertible movement in the latching direction. When the tailgate 118 is being closed, the latch 134 functions as the tailgate 118 is moved to the closed position, and afterward, when the tailgate 118 is in the closed position. With the tailgate 118 in the open position, the latch 134, having previously unlatched the tailgate 118, is in the unlatching position. To close the tailgate 118, the latch 134 is activated for non-revertible movement in the latching direction. As the tailgate 118 is moved to the closed position, the striker 136 passes into the tailgate 118 through the striker chute 132. As it passes into the tailgate 118, the striker 136 moves the latch 134 in the latching direction to the latching position, and the latch 134, unable to move in the unlatching direction to the unlatching position, latches the tailgate 118 to the surrounding body 116 against the striker 136.

In addition, the latch 134 may be deactivated for movement in the unlatching direction. When the tailgate 118 is being opened, the latch 134 functions as the tailgate 118 is moved to the open position. With the tailgate 118 in the closed position, the latch 134, having previously latched the tailgate 118, is in the latching position. To open the tailgate 118, the latch 134 is deactivated for movement in the unlatching direction. As the tailgate 118 is moved to the open position, the striker 136 passes out of the tailgate 118 through the striker chute 132. As it passes out of the tailgate 118, the striker 136, in combination with a bias for movement in the unlatching direction, moves the latch 134 in the unlatching direction to the unlatching position, and the latch 134 unlatches the tailgate 118 from the surrounding body 116 from against the striker 136.

Figure 1D:
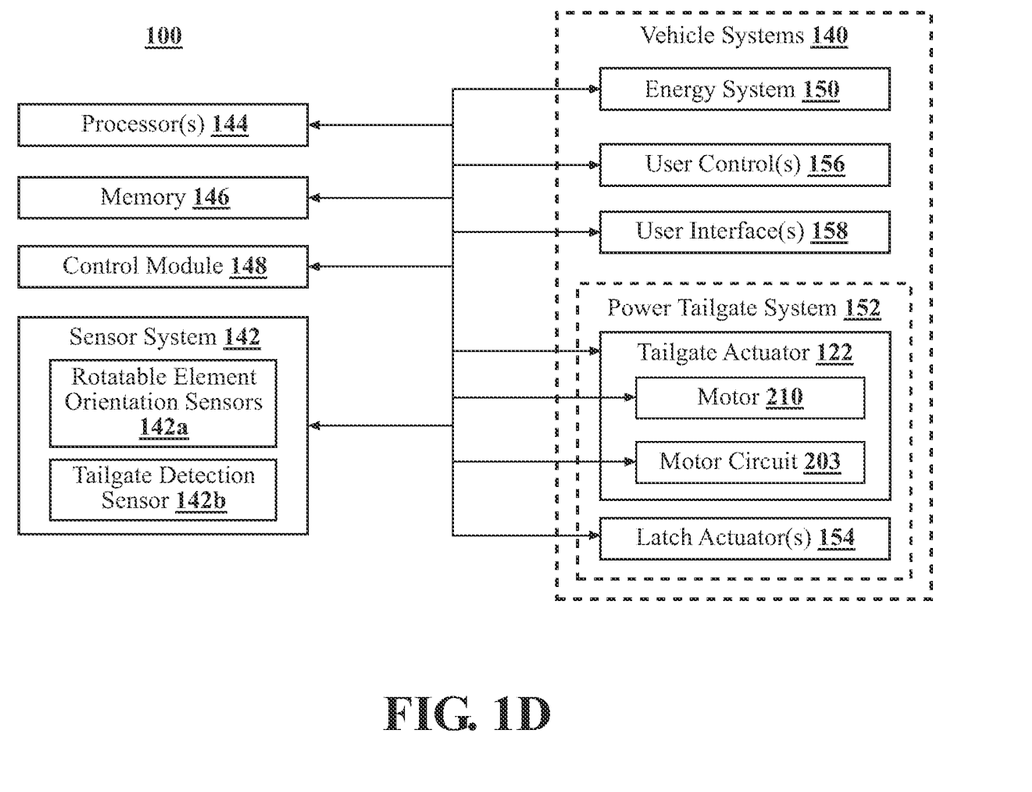
FIG. 1D is a block diagram showing elements of the vehicle, including a motor and a motor circuit, used for controlling the power tailgate system.

As shown with additional reference to FIG. 1D, the vehicle 100 includes one or more vehicle systems 140 operable to perform vehicle functions. In addition to the vehicle systems 140, the vehicle 100 includes a sensor system 142, as well as one or more processor(s) 144, memory 146, and a control module 148 to which the vehicle systems 140 and the sensor system 142 are communicatively connected. The sensor system 142 is operable to detect information about the vehicle 100. The processor(s) 144, the memory 146 and the control module 148 together serve as a computing device whose control module 148 is employable to orchestrate the operation of the vehicle 100, in whole or in part. Specifically, the control module 148 may control operation of the vehicle systems 140 based on information about the vehicle 100. Accordingly, as a prerequisite to operating the vehicle systems 140, the control module 148 gathers information about the vehicle 100, including the information about the vehicle 100 detected by the sensor system 142. The control module 148 then evaluates the information about the vehicle 100, and operates the vehicle systems 140 based on its evaluation.

The vehicle 100 can include one or more modules, at least some of which are described herein. In one or more particular arrangements, the module(s) may be stored in memory 146. The modules can be implemented as computer-readable program code that, when executed by processor(s) 144, implement one or more of the various processes described herein. One or more of the modules can be a component of the processor(s) 144, or one or more of the modules can be executed on and/or distributed among other processing systems to which the processor(s) 144 is operably connected. The modules can include instructions (e.g., program logic) executable by one or more processor(s) 144.

Generally, a module, as used herein, includes routines, programs, objects, components, data structures, and so on that perform particular tasks or implement particular data types. In further aspects, a memory generally stores the modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The control module 148 may be configured to determine, using sensor data, whether or not a tailgate 118 is operably connected to the rotatable element 301/hinge assembly 120. The control module 148 may be configured to determine, using sensor data, an angular orientation of the rotatable element 301. The control module may be configured to determine, using sensor data, a magnitude or amount and a direction of any deviation of the rotatable element 301 from the predetermined tailgate removal orientation θ. Data processing to determine any deviation of the rotatable element 301 from the predetermined tailgate removal orientation θ may be performed constantly or periodically.

The control module 148 may be configured to, using information relating to the angular orientation of the rotatable element 301, automatically control operation of the actuator 122 to produce a rotation of the rotatable element 301 from an angular orientation which has deviated from the predetermined removal orientation predetermined tailgate removal orientation θ, back to the predetermined removal orientation. This automatically positions the rotatable element 301 in the proper orientation for a user to re-connect the tailgate 118 with the rotatable element.

In particular arrangements, the control module 148 may be configured to return the rotatable element 301 to the predetermined tailgate removal orientation θ whenever the vehicle 100 is not moving. In particular arrangements, the control module 148 may be configured to return the rotatable element 301 to the predetermined tailgate removal orientation θ whenever the vehicle engine is turned off.

The vehicle systems 140 are part of, mounted to or otherwise supported by the body 104. Each vehicle system 140 includes one or more vehicle elements. On behalf of the vehicle system 140 to which it belongs, each vehicle element is operable to perform, in whole or in part, any combination of vehicle functions with which the vehicle system 140 is associated. It will be understood that the vehicle elements, as well as the vehicle systems 140 to which they belong, may but need not be mutually distinct.

The vehicle systems 140 may include an energy system 150 and a power tailgate system 152. The power tailgate system 152 may be connected to the energy system 150. Moreover, the power tailgate system 152 may be connected to the tailgate 118 and to the latch assemblies 130 when the tailgate 118 is operably connected to the rotatable element 301. The energy system 150 may be operable to perform one or more energy functions, including but not limited to storing and otherwise handling electrical energy. The power tailgate system 152 may be operable to perform one or more power tailgate 118 functions using electrical energy from the energy system 150, including but not limited to automatically opening the tailgate 118, automatically closing the tailgate 118, and checking the tailgate 118 against movement. As described herein, the power tailgate system 152 may also be operable to check the rotatable element 301 against rotation when the tailgate has been disconnected from the rotatable element. Checking the rotatable element against rotation may include preventing motion (rotational, translational, etc.) of any of the components of the hinge assembly (for example, crank 307, rotatable element 301, etc.) when the rotatable element is in the predetermined tailgate removal orientation and the hinge assembly 120 is in its predetermined tailgate removal configuration. In particular arrangements, checking the rotatable element against rotation may include preventing rotation of the rotatable element from the predetermined tailgate removal orientation to an orientation outside the predetermined tailgate removal orientation (for example, outside the range 45°±2° from the reference plane P1)

Among the power tailgate elements of the power tailgate system 152, the vehicle 100 includes the tailgate actuator 122. The tailgate actuator 122 is connected to the energy system 150. Moreover, the tailgate actuator 122 is connected with the tailgate 118 through the hinge assembly 120. Through the hinge assembly 120, the tailgate actuator 122 is operable to open the tailgate 118, close the tailgate 118 and otherwise move the tailgate 118 between the closed position and the open position using electrical energy from the energy system 150. Although the vehicle 100, as shown, includes one tailgate actuator 122 in the power tailgate system 152, it will be understood that this disclosure is applicable in principle to otherwise similar vehicles including one or more tailgate actuators 122 in the power tailgate system 152.

Also among the power tailgate elements of the power tailgate system 152, the vehicle 100 includes one or more latch actuators 154 for the latch assemblies 130. Each latch actuator 154 corresponds to a latch assembly 130, and may be housed, in whole or in part, in the tailgate 118. For instance, each latch actuator 154 may be housed in the tailgate 118, and connected to the tailgate 118, as a unitary module with the corresponding latch assembly 130. In one implementation, each latch actuator 154 is a motor-driven reduction drive. In this and other implementations, each latch actuator 154 is connected to the energy system 150 when the tailgate 118 is operably connected to the rotatable element 301 and the associated hinge assembly 120. The latch actuator 154 may be electrically connected to the energy system 150 using, for example, an electrical connector having components structured to be mateable by operably connecting the tailgate 118 with the rotatable element 301 and unmateable by disconnecting the tailgate 118 from the rotatable element. Moreover, each latch actuator 154 may be connected with the corresponding latch assembly 130. For each corresponding latch assembly 130, latch 134 and latch actuator 154, using electrical energy from the energy system 150, the latch actuator 154 is operable to activate the latch 134 for non-revertible movement in the latching direction, and deactivate the latch 134 for movement in the unlatching direction. Although the vehicle 100, as shown, includes one latch actuator 154 per latch assembly 130 in the power tailgate system 152, it will be understood that this disclosure is applicable in principle to otherwise similar vehicles including one or more latch actuators 154 per latch assembly 130 in the power tailgate system 152.

The vehicle 100 may include one or more user controls 156 and one or more user interfaces 158 for the power tailgate system 152. In the vehicle 100, the user controls 156 and the user interfaces 158 may be part of an infotainment system typical of vehicles, or dedicated to the power tailgate system 152. The user controls 156 serve as interfaces between users and the vehicle 100 itself, and are operable to receive mechanical, verbal and other user inputs for generating requests. Similarly, the user interfaces 158 serve as interfaces between users and the vehicle 100 itself, and are operable to issue tactile, sound and visual outputs that may be sensed by users. For instance, the vehicle 100 may include one or more onboard or off-board user controls 156 for remotely generating requests to automatically open the tailgate 118 from in the passenger compartment or otherwise away from the tailgate 118. For instance, the vehicle 100 may include one or more onboard or off-board user controls 156 for non-remotely generating requests to automatically open the tailgate 118 from the rear of the vehicle 100 or otherwise adjacent the tailgate 118.

In addition, as described herein, the user controls 156 may be configured for remotely generating (from in the passenger compartment or otherwise away from the tailgate 118) requests to automatically control the actuator 122 to operate the hinge assembly to rotate the tailgate 118/rotatable element 301 to the predetermined tailgate removal orientation θ from any other angular orientation or position of the tailgate 118/rotatable element 301 (including the open position, the closed position, and any partially-open position), as described herein. One or more commands generated by the user controls 156 to rotate the tailgate/rotatable element to the predetermined removal orientation may also operate to subsequently maintain the tailgate 118/rotatable element 301 in the predetermined removal orientation θ to permit a user to disconnect the tailgate 118 from the rotatable element 301 while the tailgate 118 resides in the predetermined removal orientation θ, and also to permit a user to re-connect the tailgate 118 with the rotatable element 301.

Figure 2A:
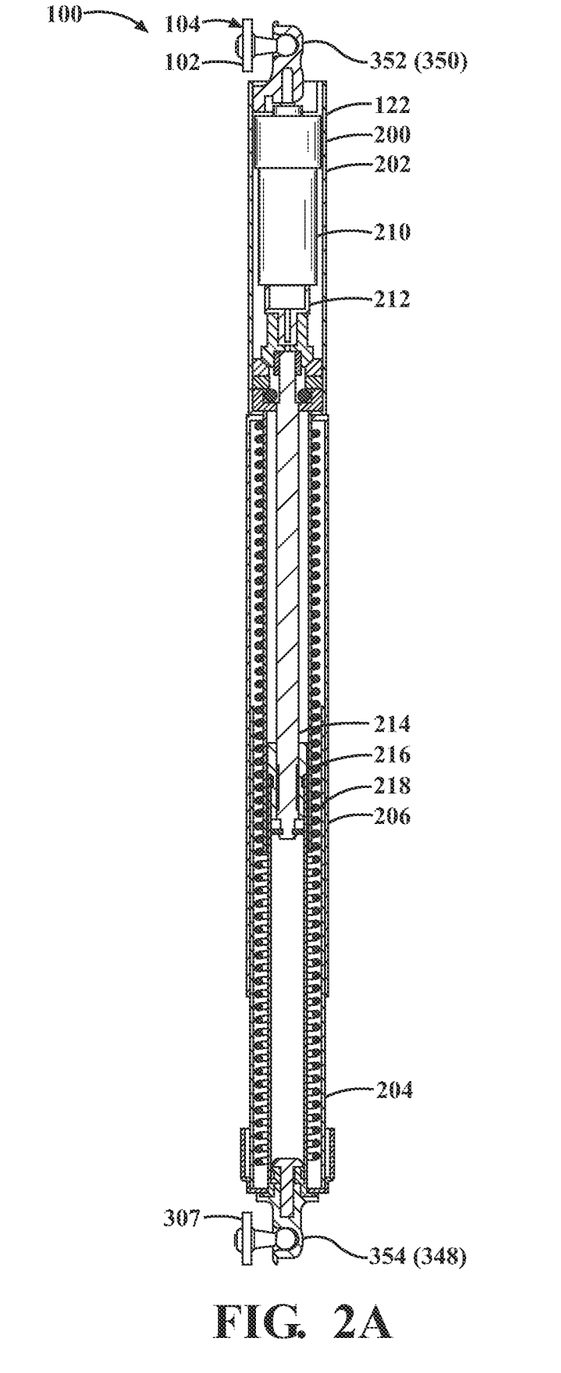
FIG. 2A portrays the tailgate actuator using a cross-sectional view taken along the line 2A-2A in FIG. 1B, showing the motor included as part of the tailgate actuator in an implementation in which the tailgate actuator is a motor-driven spindle drive.
Figure 2B:
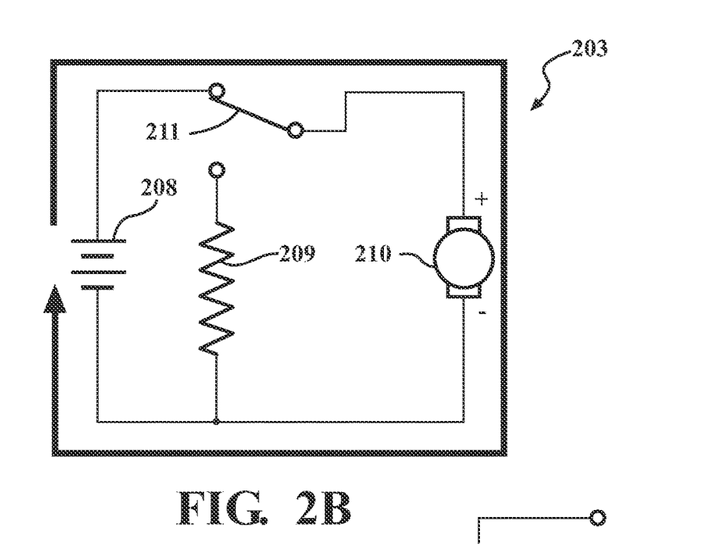
FIG. 2B portrays the motor circuit using a circuit diagram showing one aspect of operating the motor circuit to electrically brake the motor.
Figure 2C:
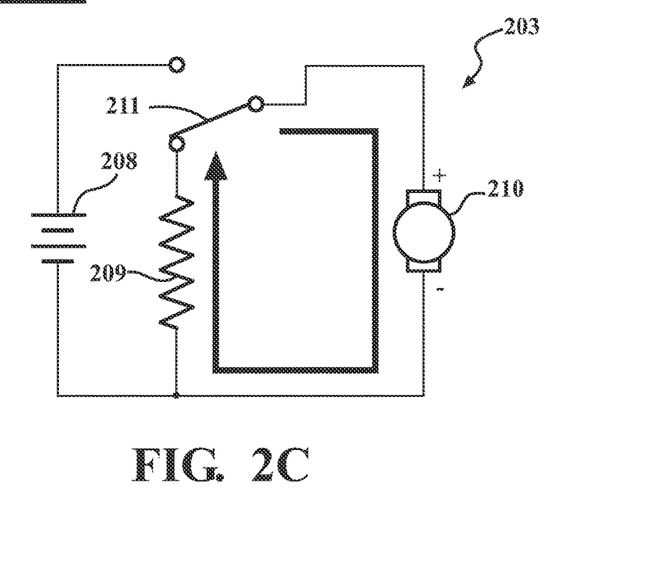
FIG. 2C portrays the motor circuit using a circuit diagram showing another aspect of operating the motor circuit to electrically brake the motor.

As shown with additional reference to FIGS. 2A-2C, among the power tailgate elements of the power tailgate system 152, as part of the tailgate actuator 122, the vehicle 100 may include a motor 210, and a motor circuit 203 for the motor 210.

As shown with particular reference to FIG. 2A, in one implementation, the tailgate actuator 122 may be a motor-driven spindle drive. The tailgate actuator 122 may include a two-piece telescoping or otherwise extensible housing 200. The housing 200 may include a tubular base 202, a tubular slide 204, and a sliding overlap 206 therebetween. Inside the housing 200, the tailgate actuator 122 includes axially aligned items for converting rotary movement into linear extension and retraction. In particular, the tailgate actuator 122 may include a fixed motor 210, a fixed reduction drive 212, a rotary screw 214, a fixed nut 216, and a spring 218. The motor 210 and the reduction drive 212 may be secured with the base 202, the nut 216 may be secured with the slide 204, and the screw 214 may run through the nut 216. The base 202 and the nut 216 may support the screw 214 for axial rotation, including powered axial rotation by the motor 210 through the reduction drive 212. In one implementation, the reduction drive 212 may be a planetary reduction drive. For instance, the reduction drive 212 may be a multistage planetary reduction drive. In one implementation, the screw 214 may be a ball screw, and the nut 216 may be a ball nut.

The motor 210 may be operable to drive the tailgate actuator 122 to extend and retract. In particular, the motor 210 may be operable to spin, and thereby power the axial rotation of the screw 214 through the reduction drive 212. As the screw 214 axially rotates, the nut 216 axially moves along the screw 214, and, as the nut 216 axially moves along the screw 214, the base 202 and the slide 204 are alternately drawn apart and drawn together. As the base 202 and the slide 204 are drawn apart, the tailgate actuator 122 is extended. Alternately, as the base 202 and the slide 204 are drawn together, the tailgate actuator 122 is retracted.

From inside the bed 102, the tailgate actuator 122 is configured to reach between the bed 102 and the crank 307. As the product of extending and retracting, the tailgate actuator 122 is operable to pivot the crank 307 against the bed 102. Likewise, to allow the tailgate actuator 122 to extend and retract in association with pivoting the crank 307 against the bed 102, the bed 102, the tailgate actuator 122 and the crank 307 serially share pivotal connections. Accordingly, the bed 102 and the tailgate actuator 122 are configured to make a pivotal connection with one another. In particular, the bed 102 includes a bracket-mounted ball stud 350, the tailgate actuator 122 includes a ball socket 352, and the ball stud 350 and the ball socket 352 are configured to make a ball-and-socket connection with one another. Moreover, the crank 307 and the tailgate actuator 122 are configured to make a pivotal connection with one another. In particular, the crank 307 includes the ball stud 348, the tailgate actuator 122 includes a ball socket 354, and the ball stud 348 and the ball socket 354 are configured to make a ball-and-socket connection with one another.

In one or more arrangements, the actuator 122 may be structured as described in previously referenced U.S. patent application Ser. No. 16/883,246.

As is known, in an actuator such as actuator 122 configured for converting rotary motion to linear motion, "back-driving" of the actuator is a condition wherein a retraction or extension of the linearly-moving portion of the actuator results in a rotary motion of a motor and/or gear train of the actuator normally directed to driving the linearly-moving portion. Back-driving may result from vibration, bouncing, jolts and like external forces generated as the vehicle drives along rough ground, accelerates and brakes. Referring to FIG. 4, since the rotatable element 301 is coupled to the actuator 122 so as to be rotationally driven by the actuator as described herein, back-driving of the actuator 122 may result in the rotatable element 301 rotating in either a direction D1 or a direction D2 away from and out of alignment with the predetermined tailgate removal orientation θ. In this case, in an embodiment where the tailgate 118 may only be disconnected from the rotatable element 301 and re-connected to the rotatable element when the rotatable element is in the predetermined tailgate removal orientation θ, the user may be prevented from re-connecting the tailgate. FIG. 4 shows the tailgate 118 in the predetermined tailgate removal orientation θ from which the tailgate may be disconnected from the rotatable element 301 and removed from the vehicle (as shown by 118'). In the embodiments shown herein, the hinge assembly 120 and actuator 122 may be structured so as to enable the tailgate 118 to rotate through a range of approximately 90° between closed and open positions, although other angular ranges are possible.

The PTG (power tailgate) system may be configured to, from the time of tailgate removal to the time of tailgate re-connection, maintain the rotatable element 301 in the predetermined tailgate removal orientation θ by preventing back-driving of the actuator 122. Various methods may be used to help prevent rotation of the rotatable element 301 due to back-driving.

In one or more arrangements, the actuator 122 may be designed and constructed so as to maximize or otherwise optimize resistance to back-drive due to externally applied forces. Generally speaking, back-drive resistance is represented by mechanical advantage and internal friction, and is increased by higher mechanical advantage and/or higher internal friction. Accordingly, the back-drive resistance of the tailgate actuator 122 may be increased by increasing the mechanical advantage and/or increasing the internal friction of any combination of the ball screw 214, the reduction drive and the motor to a degree necessary to counteract forces anticipated to be generated during a driving event. When coordinated with the anticipated external forces, increasing the back-drive resistance of the tailgate actuator 122 serves in place of set screws or other mechanical stops for preventing the rotatable element 301 from rotating out of its predetermined tailgate removal orientation θ. Accordingly, the back-drive resistance of the tailgate actuator 122 not only facilitates tool-less detachment and re-attachment of the tailgate, but also simplifies the construction of the PTG system.

In addition, the motor circuit 203 may be configured to brake the actuator 122 to generate a braking force which resists back-drive of the motor due to external forces. As shown with particular reference to FIGS. 2B and 2C, in addition to the motor 210, the motor circuit 203 may include a voltage source 208 for the motor 210, a braking resistor 209 for the motor 210, and a switch 211 for alternatively applying electrical items across (i.e., across the terminals of) the motor 210. As the product of operating the switch 211, the motor circuit 203 is operable to apply the voltage source 208 across the motor 210, as shown in FIG. 2B Likewise, with the voltage source 208 applied across the motor 210, the motor circuit 203 is operable to electrically energize the motor 210 for spinning action using voltage from the voltage source 208. Moreover, the motor circuit 203 is operable to apply a closed circuit across the motor 210, as shown in FIG. 2C. As shown, the motor circuit 203 is operable to apply the braking resistor 209 across the motor 210. Alternatively, the motor circuit 203 may be similarly operable to apply a short circuit across the motor 210. As the product of applying the braking resistor 209, a short circuit or like closed circuit across the motor 210, the motor circuit 203 is operable to electrically brake the motor 210, whereupon the motor 210 resists being mechanically driven for spinning action. Likewise, with the motor 210 connected with the tailgate 118 for interdependent movement, as the product of electrically braking the motor 210, the motor circuit 203 is operable to check the tailgate 118 against movement.

Figure 2D:
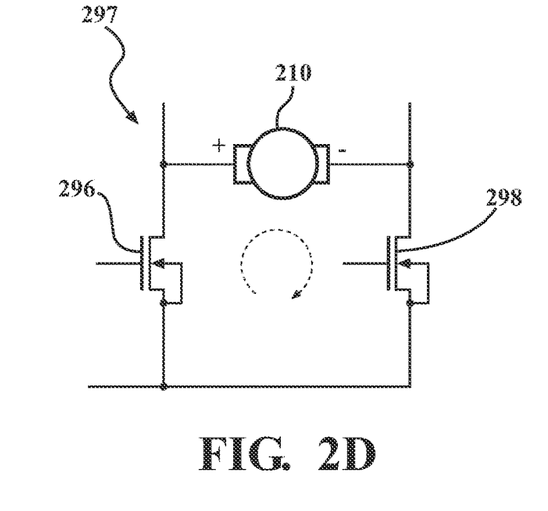
FIG. 2D is a schematic view of one embodiment of a portion of a motor circuit used to apply a short circuit to the motor.

In one particular method of applying a short circuit to the motor, an H-bridge circuit 297 with a pair of field effect transistors (FET's) 296 and 298 may be used as shown in FIG. 2D. As is known, an H-bridge circuit may be employed to switch the polarity of a voltage applied to a load.

The operation of the motor just described may also be used to prevent back-drive of the motor 210 to aid in maintaining the angular orientation of the rotatable element 301 when the rotatable element is in the predetermined tailgate removal orientation θ as described herein. That is, the rotatable element 301 is operably connected to the crank 307 so that rotation of the crank produces a corresponding rotation of the rotatable element. In addition, the crank 307 is operably connected to the actuator 122 so that extension and retraction of the actuator produces rotation of the crank 307. Also, extension and retraction of the actuator 122 is controlled by operation of the motor/motor circuit. Thus, electrically braking the motor as described herein to may be employed to check rotation of the rotatable element 301 as well as checking movement of the tailgate 118 when the tailgate is operably connected to the rotatable element.

As part of the sensor system 142, the vehicle 100 may include one or more onboard sensors. The sensors may monitor the vehicle 100 in real-time. The sensors, on behalf of the sensor system 142, are operable to detect information about the vehicle 100, including information about the operation of the vehicle 100. Among the sensors, the vehicle 100 includes one or more tailgate sensors, one or more latch sensors, one or more controller area network (CAN) sensors and the like. Relatedly, among information about the operation of the vehicle 100, the sensor system 142 is operable to detect the driving conditions of the vehicle 100, the movement of the tailgate 118, the movement of the latches 134, requests to automatically open the tailgate 118, requests to automatically close the tailgate 118, and the operational statuses of one, some or all of the vehicle systems 140, including the energy system 150, the tailgate actuator 122 and the latch actuators 154.

In embodiments described herein, the sensor system may also include one or more rotatable element orientation sensors 142a configured to gather data indicative of a current angular orientation of the rotatable element 301. Data from the sensor(s) 142a may be used to determine the presence of the rotatable element in the predetermined tailgate removal orientation θ and also to detect a deviation of the rotatable element orientation from the predetermined removal orientation in either the opening direction D1 or the closing direction D2 (FIG. 4) of the tailgate. As shown in FIG. 4, the rotatable element angular orientation may deviate an angle α from the predetermined removal orientation θ in a direction D1 toward the tailgate open position. The rotatable element angular orientation may alternatively deviate an angle β from the predetermined removal orientation θ in a direction D2 toward the tailgate closed position. The control module 148 may be configured to determine, using data from sensor(s) 142, an amount (in degrees, radians, etc.) and a direction of the deviation of the rotatable element 301 from the predetermined removal orientation θ.

Any suitable type(s) of sensor(s) may be used for determining the angular orientation of the rotatable element 301. In one or more arrangements, for example, the rotatable element orientation sensors 142a may include a Hall Effect sensor operably coupled to the rotatable element 301 to acquire data relating to the rotatable element angular orientation. In one or more arrangements, the rotatable element orientation sensors 142a may include an actuator slide position sensor configured to detect a position of the actuator slide 204 relative to a predetermined reference position of the slide (for example, with respect to the actuator base 202. The slide position sensor may be incorporated into the actuator 122. The relative position of the slide 204 when the rotatable element 301 is in the predetermined removal orientation θ may be known. The relative positions of the slide 204 may be associated with respective angular orientations of the rotatable element 301 and stored in memory 146, for example in the form of one or more look-up tables. The control module 148 may be configured to determine the current rotatable element angular orientation using data from the slide position sensor. Using this data, the control module 148 may also determine the direction and magnitude of any deviation of the rotatable element angular orientation from the known predetermined tailgate removal orientation θ (for example, due to back-driving of the slide 204). Using the detected deviation of the rotatable element from the predetermined tailgate removal orientation θ and the known relationships between the actuator extension, crank orientation, and rotatable member orientation, the control module may operate the actuator 122 to correctively rotate crank 307 and rotatable member 301 to an angular orientation corresponding predetermined tailgate removal orientation θ.

In addition, the sensor system 142 may include a tailgate detection sensor 142b configured for detecting the whether or not the tailgate is operably connected to the rotatable element 301 (i.e., whether or not the tailgate is mounted on the vehicle).

Figure 3:
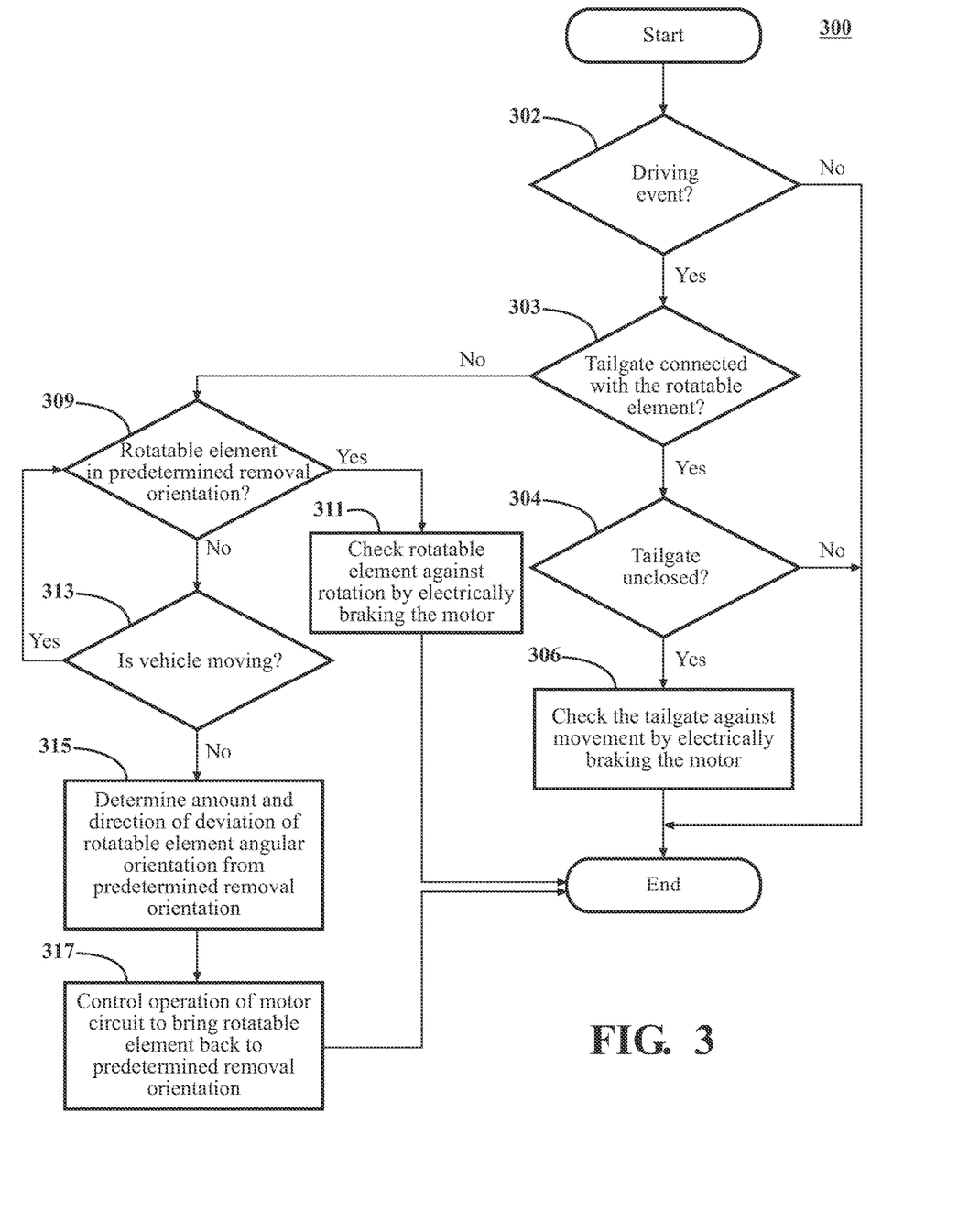
FIG. 3 portrays the operations of a process for operating the power tailgate system using a flow chart, showing aspects of checking the tailgate against movement when the tailgate is unclosed and also checking the rotatable element against rotation when the rotatable element is in a predetermined tailgate removal orientation θ of the rotatable element after removal of the tailgate form the vehicle.

The operations of a process 300 for operating the power tailgate system 152 are shown in FIG. 3. According to the process 300, when, upon the initiation of driving events, the tailgate 118 is unclosed, the power tailgate system 152 may check the tailgate 118 against movement by electrically braking the motor 210. Although the process 300 is described with reference to one tailgate actuator 122, including, as part of the tailgate actuator 122, one motor 210, and one motor circuit 203, and one latch actuator 154 and corresponding latch assembly 130 and latch 134, it will be understood that this disclosure is applicable in principle to otherwise similar processes for one or more tailgate actuators 122, one or more motors 210, one or more motor circuits 203, one or more latch actuators 154, one or more latch assemblies 130 and one or more latches 134.

According to the process 300, the control module 148 gathers information about the vehicle 100 for evaluation, including the driving conditions of the vehicle 100, the movement of the tailgate 118, the movement of the motor 210, the movement of the latch 134, and other information about the vehicle 100 detected by the sensor system 142. For instance, with respect to the driving conditions of the vehicle 100, the control module 148 monitors for and identifies driving events indicating the vehicle 100 evidently or prospectively driving along the ground. Moreover, the control module 148 monitors for and identifies driving conditions, including the vehicle 100 evidently or prospectively driving along rough ground, accelerating, decelerating, vibrating, etc. For instance, with respect to any combination of the movement of the tailgate 118 and the movement of the motor 210, the control module 148 monitors for and identifies closed events, open events and partially-open events respectively indicating movement of the tailgate 118 to the closed position, to the open position and to a partially-open position. Moreover, the control module 148 monitors for and identifies movement events indicating movement of the tailgate 118 between the closed position and the open position. For instance, with respect to the movement of the latch 134, the control module 148 monitors for and identifies latching events and unlatching events respectively indicating movement of the latch 134 to the latching position and to the unlatching position.

In operation 302, as part of its evaluation of the information about the vehicle 100, the control module 148 monitors for and identifies a driving event. When the control module 148 does not identify a driving event, it continues to monitor for driving events in anticipation that a driving event will materialize.

In operation 303, upon the initiation of the driving event, the control module 148 may determine (using data from the tailgate detection sensor 142b) if a tailgate 118 is operably connected with the rotatable element 301.

In operation 304, also as part of its evaluation of the information about the vehicle 100, if it is determined that a tailgate 118 is operably connected with the rotatable element 301, the control module 148 may identify whether the tailgate 118 is in the closed position, or in the open position, in a partially-open position, or otherwise unclosed. For instance, the control module 148 may identify that the tailgate 118 is in the closed position based on any combination of a closed event and an unlatching event. For instance, the control module 148 may identify that the tailgate 118 is unclosed based on any combination of an open event, a partially-open event and an unlatching event. The control module 148 may identify that the tailgate 118 is, in particular, in the open position based on an open event. Likewise, the control module 148 may identify that the tailgate 118 is, in particular, in a partially-open position based on a partially-open event.

When the tailgate 118 is in the closed position, the control module 148 may jump to the end of the process 300, and does not check the tailgate 118 against movement during the driving event. For instance, it may be assumed that the latches 134, by latching the tailgate 118, hold it fast against movement.

Otherwise, when the tailgate 118 is unclosed, in operation 306, in response to identifying that the tailgate 118 is unclosed, the control module 148 checks the tailgate 118 against movement during the driving event. For instance, it may be assumed that the latches 134, by unlatching the tailgate 118, no longer hold it fast against movement. Moreover, it may be assumed that, if the tailgate 118 is left unchecked against movement, the movement of the tailgate 118 might become excessive. For instance, when the vehicle 100 drives along rough ground, the movement of the tailgate 118 might become excessive in terms bouncing. Even when the vehicle 100 drives along normal ground, the movement of the tailgate 118 might become excessive in terms of jolts (e.g., when the vehicle 100 accelerates and decelerates) and vibration (e.g., when the vehicle 100 itself vibrates). By checking the tailgate 118 against movement during the driving event, the control module 148 saves the vehicle 100 from suffering the associated threat of damage.

According to operation 306, the control module 148 may check the tailgate 118 against movement by operating the motor circuit 203 to electrically brake the motor 210. To electrically brake the motor 210, the control module 148 may operate the motor circuit 203 to apply a closed circuit across the motor 210. For instance, the control module 148 may operate the motor circuit 203 to apply the braking resistor 209 across the motor 210. For instance, the control module 148 may operate the motor circuit 203 to apply a short circuit across the motor 210.

With respect to checking the tailgate 118 against movement during the driving event according to operation 306, the control module 148 may continuously check the tailgate 118 against movement for the duration of the driving event. With respect to checking the tailgate 118 against movement according to operation 306, the control module 148 may fully check the tailgate 118 against movement by operating the motor circuit 203 to continuously electrically brake the motor 210. Alternatively, the control module 148 may partially check the tailgate 118 against movement by operating the motor circuit 203 to alternately electrically brake the motor 210 and apply an open circuit across the motor 210 under a pulse width modulation (PWM) control. For instance, the control module 148 may adjust the PWM control to balance electrically braking the motor 210 and applying an open circuit across the motor 210. To increasingly check the tailgate 118 against movement, the control module 148 may adjust the PWM control to increasingly favor electrically braking the motor 210. To decreasingly check the tailgate 118 against movement, the control module 148 may adjust the PWM control to increasingly favor applying an open circuit across the motor 210.

For instance, as part of its evaluation of the information about the vehicle 100, the control module 148 may identify whether or not driving conditions are associated with the movement of the tailgate 118 becoming excessive. For instance, the control module 148 may identify that driving conditions are associated with the movement of the tailgate 118 becoming excessive in association with the vehicle 100 evidently or prospectively driving along rough ground, accelerating, decelerating, vibrating, etc., and otherwise identify that driving conditions are not associated with the movement of the tailgate 118 becoming excessive. For instance, the control module 148 may default to fully checking the tailgate 118 against movement, and switch to partially checking the tailgate 118 against movement when driving conditions are not associated with the movement of the tailgate 118 becoming excessive. Likewise, when driving conditions are thereafter associated with the movement of the tailgate 118 becoming excessive, the control module 148 may switch back to fully checking the tailgate 118 against movement.

For instance, when the control module 148 identifies that the tailgate 118 is in the open position according to operation 304, the control module 148 may fully check the tailgate 118 against movement. For instance, when the control module 148 identifies that the tailgate 118 is in a partially-open position according to operation 304, the control module 148 may partially check the tailgate 118 against movement until it identifies that the tailgate 118 is in the open position, and thereafter fully check the tailgate 118 against movement. For instance, it may be assumed that when the tailgate 118 is in a partially-open position, it is particularly likely that the movement of the tailgate 118 will become excessive. Accordingly, it may be assumed that the tailgate 118 should be temporarily partially checked against movement, and thereby allowed to advance toward the open position with gravity, until it reaches the open position, whereupon the tailgate 118 should remain fully checked against movement.

According to operations 302, 304 and 306, the control module 148 checks the tailgate 118 against movement as a preventative countermeasure against the movement of the tailgate 118 becoming excessive during the driving event. In particular, rather than reacting to the movement of the tailgate 118, the control module 148 may check the tailgate 118 against movement upon the initiation of the driving event, irrespective of whether the tailgate 118 is moving or not moving. Compared to checking the tailgate 118 against movement as a corrective countermeasure against the movement of the tailgate 118 becoming excessive, the control module 148 eliminates issues concerning reaction time.

Returning to operation 303, if it is determined that a tailgate is not operably connected with the rotatable element 301, control may pass to operation 309 where the control module 148 may determine (using data from rotatable element orientation sensors 142a) if the rotatable element 301 is in the predetermined removal orientation θ. In one or more arrangements, the control module 148 may default to maintaining the rotatable element 301 in the predetermined removal orientation θ if no tailgate is present, so that a user may re-connect the tailgate whenever desired.

For purposes of controlling rotation of the rotatable element 301 when no tailgate is attached, driving conditions where the rotatable element may be thrown out of the predetermined removal orientation θ by external forces caused by bouncing, jolts, vibration, etc. during the driving event may be referred to as "severe" driving conditions. If the rotatable element is not checked against rotation, the rotatable element may be thrown out of the predetermined removal orientation θ by external forces caused by bouncing, jolts, vibration, etc. during the driving event. By checking the rotatable element against rotation during the driving event when no tailgate is present, the rotatable element may be maintained in the in the predetermined removal orientation for the convenience of the user. In some vehicle operating environments, forces acting on the rotatable element may be sufficiently low that rotation of the rotatable element may be checked by the internal resistance of the actuator gear train to backdriving. However, in operating environments where the vehicle encounters severe shock and/or vibration, gear train resistance to backdriving may be insufficient to prevent undesired rotation of the rotatable element. Electrically braking the motor using one of the methods described herein may provide additional backdrive resistance sufficient to prevent rotation of the rotatable member in more severe operating environments. That is, to prevent rotation of the rotatable element out of the predetermined removal orientation, operation of the motor may be controlled to electrically brake the motor using a method previously described for braking the motor with a tailgate attached to the vehicle or any other method described herein.

Thus, in one particular operational mode directed to maintaining the rotatable element 301 in the predetermined removal orientation, if it is determined that the rotatable element 301 is in the predetermined removal orientation and if driving conditions are determined not to be severe, the internal resistance to backdrive provided by the motor and/or gears of the actuator 122 may be relied upon to prevent rotation of the rotatable element 301 out of the predetermined removal orientation θ if no tailgate is present. However, if it is determined that the rotatable element 301 is in the predetermined removal orientation and driving conditions are determined to be severe, the control module 148 may check the rotatable element against rotation during the driving event by electrically braking the motor, in a manner similar to that described with regard to operation 306.

In another particular operational mode directed to maintaining the rotatable element 301 in the predetermined removal orientation, the control module 148 may check the rotatable element against rotation during the driving event by electrically braking the motor in a manner similar to that described with regard to operation 306 whenever it is determined that the rotatable element 301 is in the predetermined removal orientation, and for the duration of the driving event. In one or more arrangements, this may be a default operational mode of the system. In this operational mode, the control module may not need to detect and respond to severe driving conditions for purposes of controlling rotation of the rotatable element. Also, operation of the system in this mode may prevent the rotatable element from becoming misaligned by sudden, unexpected severe driving conditions before the control module can respond by electrically braking the motor to provide additional backdrive resistance.

Referring again to FIG. 3, if it is determined that the rotatable element 301 in the predetermined removal orientation, the control module 148 may (in operation 311 of FIG. 3) check the rotatable element against rotation during the driving event by electrically braking the motor in a manner similar to that described with regard to operation 306. According to operation 311, the control module 148 may check the rotatable element 301 against movement by operating the motor circuit 203 to electrically brake the motor 210 when the tailgate is not attached to the vehicle and the rotatable element 301 is in the predetermined removal orientation. To electrically brake the motor 210, the control module 148 may operate the motor circuit 203 to apply a closed circuit across the motor 210. For instance, the control module 148 may operate the motor circuit 203 to apply the braking resistor 209 across the motor 210. For instance, the control module 148 may operate the motor circuit 203 to apply a short circuit across the motor 210.

With respect to checking the rotatable element 301 against rotation during the driving event according to operation 311, the control module 148 may continuously check the rotatable element 301 against rotation for the duration of the driving event. With respect to checking the rotatable element 301 against rotation according to operation 311, the control module 148 may fully check the rotatable element 301 against rotation by operating the motor circuit 203 to continuously electrically brake the motor 210.

Alternatively, and as stated previously, as part of its evaluation of the information about the vehicle 100, the control module 148 may identify whether or not driving conditions may be associated with movement of the rotatable element 301 and/or other hinge assembly components becoming excessive (i.e., severe driving conditions). For instance, the control module 148 may identify that vehicle driving conditions (for example driving along rough ground, accelerating, decelerating, vibrating, etc.) may produce undesirable rotation of the rotatable element 301 and may otherwise identify that driving conditions are not associated with undesirable rotation of the rotatable element. In such a case, the control module 148 may default to checking the rotatable element against rotation by controlling operation of the motor as described herein and switch to checking the rotatable element against rotation using only the inherent backdrive resistance of the gears and motor and not actively controlling operation of the motor when driving conditions are not associated with possible undesirable rotation of the rotatable element. Likewise, when subsequent driving conditions may cause possible undesirable rotation of the rotatable element, the control module 148 may switch back to checking the rotation of the rotatable element by controlling operation of the motor.

Thus, according to operations 309 and 311, the control module 148 may check the rotatable element 301 against rotation as a preventative countermeasure against the undesirable rotation of the rotatable element out of the predetermined removal orientation θ due to external forces when the tailgate has been disconnected from the rotatable element. In addition, returning to operation 309, if it is determined that the rotatable element is not in the predetermined removal orientation θ, the control module 148 may (in operation 313) determine if the vehicle is currently moving.

If the vehicle is currently moving, control may cycle back to operation 309 until the vehicle is no longer moving. However, the control module 148 may be configured to, if the vehicle is not moving and responsive to the determination that the rotatable element 301 does not reside in the predetermined tailgate removal orientation, determine (in operation 315) a direction of any deviation of the rotatable element from the predetermined tailgate removal orientation, and also determine an amount of any deviation of the rotatable element from the predetermined tailgate removal orientation.

The control module may also be configured to control rotation of the rotatable element to bring the rotatable element 301 to the predetermined tailgate removal orientation (operation 317). Rotation of the rotatable element to bring the rotatable element to the predetermined tailgate removal orientation may be controlled by controlling operation of the motor circuit to control the motor 210 operably coupled to the rotatable element, in a manner described herein. That is, based on the detected deviation of the rotatable element from the predetermined tailgate removal orientation θ and the known relationships between the actuator extension, crank orientation, and rotatable member orientation, the control module may operate the actuator 122 to correctively rotate crank 307 and rotatable member 301 to an angular orientation corresponding predetermined tailgate removal orientation θ.

In one or more arrangements, determination of the amount and direction of deviation from the predetermined tailgate removal orientation and control rotation of the rotatable element to bring the rotatable element to the predetermined tailgate removal orientation may be performed whenever the vehicle stops during a driving event. In one or more arrangements, determination of the amount and direction of deviation from the predetermined tailgate removal orientation and control rotation of the rotatable element to bring the rotatable element to the predetermined tailgate removal orientation may be performed at the termination of a driving event, after the vehicle engine has been turned off. With the engine turned off, rotation of the rotatable element 301 by the actuator 122 in this instance may be powered by the vehicle battery or another suitable power source.

With reference once again to FIG. 1D, as noted above, the processor(s) 144, the memory 146 and the control module 148 together serve as a computing device whose control module 148 orchestrates the operation of the vehicle 100, including but not limited to the operation of the vehicle systems 140. The control module 148 may be a dedicated control module for the power tailgate system 152, and may be housed, in whole or in part, in the tailgate 118. Relatedly, as part of a central control system, the vehicle 100 may include a global control unit (GCU) to with which the control module 148 is communicatively connected. Alternatively, the control module 148 may be a global control module. Relatedly, as part of a central control system, the vehicle 100 may include a global control unit (GCU) to which the control module 148 belongs. Although the vehicle 100, as shown, includes one control module 148, it will be understood that this disclosure is applicable in principle to otherwise similar vehicles including multiple control modules 148.

The processor(s) 144 may be any components configured to execute any of the processes described herein or any form of instructions to carry out such processes or cause such processes to be performed. The processor(s) 144 may be implemented with one or more general-purpose or special-purpose processors. Examples of suitable processor(s) 144 include microprocessors, microcontrollers, digital signal processors or other forms of circuitry that execute software. Other examples of suitable processor(s) 144 include without limitation central processing units (CPUs), array processors, vector processors, digital signal processors (DSPs), field programmable gate arrays (FPGAs), programmable logic arrays (PLAs), application specific integrated circuits (ASICs), programmable logic circuitry or controllers. The processor(s) 144 may include at least one hardware circuit (e.g., an integrated circuit) configured to carry out instructions contained in program code. In arrangements where there are multiple processor(s) 144, the processor(s) 144 may work independently from each other or in combination with one another.

The memory 146 may be a non-transitory computer readable medium. The memory 146 may include volatile or nonvolatile memory, or both. Examples of suitable memory 146 includes random access memory (RAM), flash memory, read only memory (ROM), programmable read only memory (PROM), erasable programmable read only memory (EPROM), electrically erasable programmable read only memory (EEPROM), registers, magnetic disks, optical disks, hard drives or any other suitable storage medium, or any combination of these. The memory 146 includes stored instructions in program code. Such instructions are executable by the processor(s) 144 or the control module 148. The memory 146 may be part of the processor(s) 144 or the control module 148, or may be communicatively connected the processor(s) 144 or the control module 148.

Generally speaking, the control module 148 includes instructions that may be executed by the processor(s) 144. The control module 148 may be implemented as computer readable program code that, when executed by the processor(s) 144, execute one or more of the processes described herein. Such computer readable program code may be stored on the memory 146. The control module 148 may be part of the processor(s) 144, or may be communicatively connected the processor(s) 144.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

While recited characteristics and conditions of the invention have been described in connection with certain embodiments, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A vehicle power tailgate system, comprising:
a processor; and
a memory communicably coupled to the processor and storing instructions that when executed by the processor cause the processor to:
upon initiation of a driving event in a vehicle, identify when no tailgate is operably connected with a rotatable element structured for transmitting rotational force to the tailgate;
responsive to identifying that no tailgate is operably connected with the rotatable element, determine if the rotatable element resides in a predetermined tailgate removal orientation; and
responsive to a determination that the rotatable element resides in the predetermined tailgate removal orientation, check the rotatable element against rotation during the driving event by electrically braking a motor operably connected with the rotatable element for interdependent movement.

2. The system of claim 1, wherein electrically braking the motor includes applying a closed circuit across the motor.

3. The system of claim 1, wherein electrically braking the motor includes at least one of applying a braking resistor across the motor, and applying a short circuit across the motor.

4. The system of claim 1, wherein checking the rotatable element against rotation during the driving event includes continuously checking the rotatable element against rotation for a duration of the driving event.

5. The system of claim 1, wherein checking the rotatable element against rotation includes operating a motor circuit for the motor to continuously electrically brake the motor.

6. The system of claim 1, wherein checking the rotatable element against rotation includes operating a motor circuit for the motor to alternately electrically brake the motor and apply an open circuit across the motor under a PWM control.

7. The system of claim 1, wherein checking the rotatable element against rotation includes adjusting a PWM control.

8. The system of claim 1 wherein the memory further includes instructions that when executed by the processor cause the processor to:
determine a direction of any deviation of the rotatable element from the predetermined tailgate removal orientation; and
determine an amount of any deviation of the rotatable element from the predetermined tailgate removal orientation.

9. The system of claim 8, wherein the memory further includes instructions that when executed by the processor cause the processor to, responsive to a determination that the rotatable element does not reside in the predetermined tailgate removal orientation, control rotation of the rotatable element to bring the rotatable element to the predetermined tailgate removal orientation.

10. A method for operating a vehicle power tailgate system, comprising steps of:
    upon initiation of a driving event in a vehicle, identifying when no tailgate is operably connected with a rotatable element structured for transmitting rotational force to the tailgate;
    responsive to identifying that no tailgate is operably connected with the rotatable element, determining if the rotatable element resides in a predetermined tailgate removal orientation; and
    responsive to a determination that the rotatable element resides in the predetermined tailgate removal orientation, checking the rotatable element against rotation during the driving event by electrically braking a motor operably connected with the rotatable element for interdependent movement.

11. The method of claim 10, wherein the step of electrically braking the motor includes a step of applying a closed circuit across the motor.

12. The method of claim 10, wherein the step of electrically braking the motor includes a step of at least one of applying a braking resistor across the motor, and applying a short circuit across the motor.

13. The method of claim 10, wherein the step of checking the rotatable element against rotation during the driving event includes a step of continuously checking the rotatable element against rotation for a duration of the driving event.

14. The method of claim 10, wherein the step of checking the rotatable element against rotation includes a step of operating a motor circuit to continuously electrically brake the motor.

15. The method of claim 10, wherein the step of checking the rotatable element against rotation includes a step of operating a motor circuit to alternately electrically brake the motor and apply an open circuit across the motor under a PWM control.

16. The method of claim 10, wherein the step of checking the rotatable element against rotation includes a step of adjusting a PWM control.

17. The method of claim 10 wherein the step of determining if the rotatable element resides in the predetermined tailgate removal orientation includes steps of:
    determining a direction of any deviation of the rotatable element from the predetermined tailgate removal orientation; and
    determining an amount of any deviation of the rotatable element from the predetermined tailgate removal orientation.

18. The method of claim 17, further comprising the step of, responsive to a determination that the rotatable element does not reside in the predetermined tailgate removal orientation, control rotation of the rotatable element to bring the rotatable element to the predetermined tailgate removal orientation.

19. A vehicle power tailgate system, comprising:
    a processor; and
    a memory communicably coupled to the processor and storing instructions that when executed by the processor cause the processor to:
        upon initiation of a driving event in a vehicle, identify when no tailgate is operably connected with a rotatable element structured for transmitting rotational force to the tailgate;
        responsive to identifying that no tailgate is operably connected to the rotatable element, determine if the rotatable element resides in a predetermined tailgate removal orientation; and
        responsive to a determination that the rotatable element does not reside in the predetermined tailgate removal orientation, control rotation of the rotatable element to bring the rotatable element to the predetermined tailgate removal orientation.

20. The system of claim 19 wherein the memory further includes instructions that when executed by the processor causes the processor to, responsive to a determination that the rotatable element resides in the predetermined tailgate removal orientation, check the rotatable element against rotation during the driving event by braking a motor operably connected with the rotatable element for interdependent movement.

* * * * *